United States Patent
Mao

(10) Patent No.: US 11,652,407 B2
(45) Date of Patent: May 16, 2023

(54) SWITCHING CAPACITOR CONVERTER AND DRIVING CIRCUIT

(71) Applicant: Nanjing Silergy Micro Technology Co., Ltd., Nanjing (CN)

(72) Inventor: Lang Mao, Nanjing (CN)

(73) Assignee: Nanjing Silergy Micro Technology Co., Ltd., Nanjing (CN)

(*) Notice: Subject to any disclaimer, the term of this patent is extended or adjusted under 35 U.S.C. 154(b) by 0 days.

(21) Appl. No.: 17/522,106

(22) Filed: Nov. 9, 2021

(65) Prior Publication Data

US 2022/0181968 A1   Jun. 9, 2022

(30) Foreign Application Priority Data

Dec. 5, 2020 (CN) .......................... 202011394429.5

(51) Int. Cl.
*H02M 3/07* (2006.01)

(52) U.S. Cl.
CPC ..................................... *H02M 3/07* (2013.01)

(58) Field of Classification Search
CPC ................................ H02M 3/07; H02M 1/088
See application file for complete search history.

(56) References Cited

U.S. PATENT DOCUMENTS

| | | | |
|---|---|---|---|
| 7,227,277 B2 | 6/2007 | Chapman et al. | |
| 7,256,568 B2 | 8/2007 | Lam et al. | |
| 8,310,846 B2 | 11/2012 | Piazzesi | |
| 8,853,888 B2 | 10/2014 | Khaligh | |
| 9,130,460 B2 | 9/2015 | Sun et al. | |
| 9,257,916 B2 | 2/2016 | Cheng et al. | |
| 9,543,822 B2 | 1/2017 | Hang et al. | |
| 9,559,591 B2 | 1/2017 | Hang et al. | |
| 2007/0052397 A1* | 3/2007 | Thompson | H02M 5/293 323/223 |
| 2008/0231115 A1 | 9/2008 | Cho et al. | |
| 2008/0258688 A1 | 10/2008 | Hussain et al. | |
| 2012/0153729 A1 | 6/2012 | Song et al. | |
| 2013/0063180 A1 | 3/2013 | Sun et al. | |
| 2014/0300413 A1* | 10/2014 | Hoyerby | H03F 3/2171 327/109 |
| 2015/0078045 A1 | 3/2015 | Zhang et al. | |
| 2016/0211745 A1 | 7/2016 | Hang et al. | |
| 2017/0063238 A1 | 3/2017 | Hang et al. | |
| 2017/0272026 A1* | 9/2017 | Yamato | H02P 6/16 |
| 2017/0279279 A1 | 9/2017 | Shimada et al. | |
| 2018/0198361 A1 | 7/2018 | Seong et al. | |
| 2021/0083573 A1* | 3/2021 | Yen | H02M 3/073 |
| 2022/0166324 A1* | 5/2022 | Liu | H02M 1/08 |

FOREIGN PATENT DOCUMENTS

CN   110535332 B   12/2019

* cited by examiner

*Primary Examiner* — Sibin Chen

(57) ABSTRACT

A driving circuit for a switching capacitor converter, the driving circuit including: a first driver, a second driver, a third driver, and a fourth driver, configured to respectively drive a first power switch, a second power switch, a third power switch, and a fourth power switch according to corresponding logic control signals; and a charge pump circuit configured to raise a DC bus voltage by a first voltage to obtain a pumping voltage to supply power to the first driver, where the first, second, third, and fourth power switches are sequentially coupled in series between the DC bus voltage and a reference ground.

11 Claims, 5 Drawing Sheets

SWITCHING CAPACITOR CONVERTER AND DRIVING CIRCUIT

RELATED APPLICATIONS

This application claims the benefit of Chinese Patent Application No. 202011394429.5, filed on Dec. 2, 2020, which is incorporated herein by reference in its entirety.

FIELD OF THE INVENTION

The present invention generally relates to the field of power electronics, and more particularly to switching capacitor converters and driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
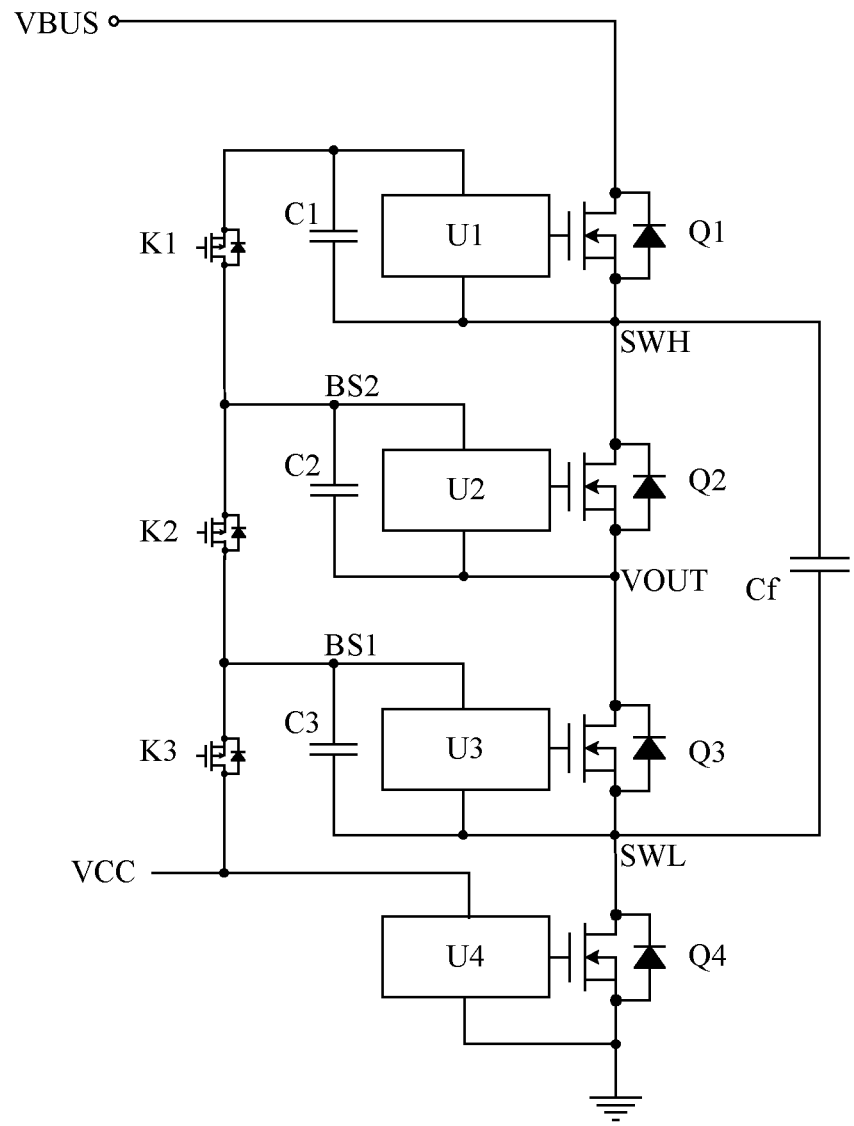
FIG. 1 is a schematic block diagram of an example switching capacitor converter.

Switching capacitor converters are widely used for fast charging technology of mobile devices (e.g., mobile phones, etc.) due to advantages of relatively small input current, no large-size power inductor, low switch voltage stress, and high efficiency. Referring now to FIG. 1, shown is a schematic block diagram of an example switching capacitor converter. The single-phase switching capacitor converter can include four power switches. Since the drain potential of each power switch is different, the four power switches may require independent drivers. The driver of the power switch may need to provide a large driving current, so the switching capacitor converter IC may require external three bootstrap capacitors C1, C2, and C3, and switches K1, K2, and K3 matched with three capacitors C1, C2, and C3.

In the operation principle of the driving circuit, when power switches Q2 and Q4 are turned on, switches K1 and K3 can be turned on, voltage VCC can charge bootstrap capacitor C3, and bootstrap capacitor C2 can charge bootstrap capacitor C1. In addition, when power switches Q1 and Q3 are turned on, switch K2 can be turned on, and bootstrap capacitor C3 can charge bootstrap capacitor C2, thereby supplying power to each driver. In the case of the two-phase switching capacitor converter, more bootstrap capacitors may be needed due to the increase of power switches. The increase of external capacitors may also require an integrated circuit (IC) to provide more connection pins, which is not conducive to the miniaturization of the IC, nor system integration.

Figure 2:
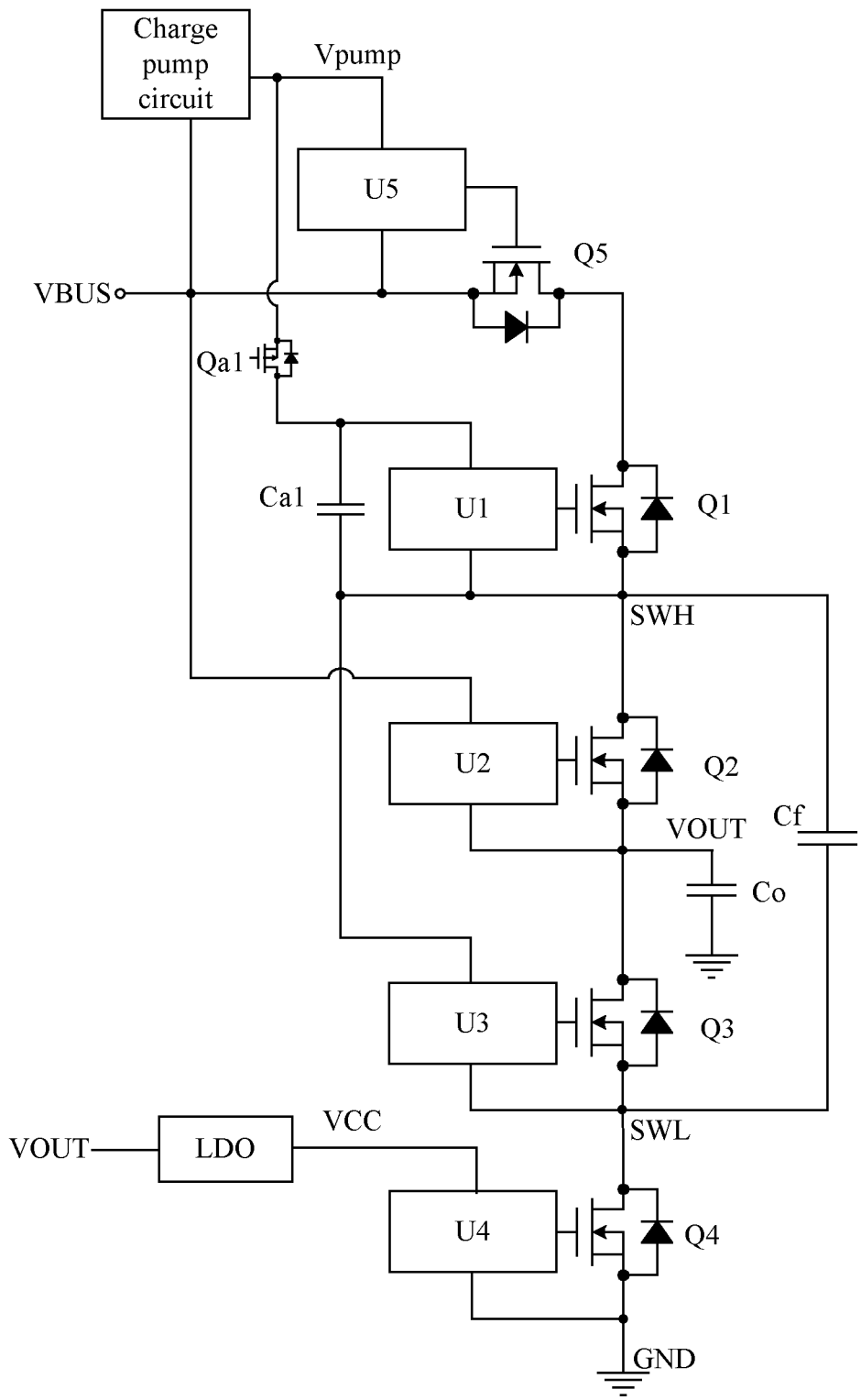
FIG. 2 is a schematic block diagram of an example switching capacitor converter, in accordance with embodiments of the present invention.

Referring to FIG. 2, shown is a schematic block diagram of an example switching capacitor converter, in accordance with embodiments of the present invention. In this particular example, the switching capacitor converter can include a drive circuit, power switches Q1-Q4, flying capacitor Cf, and output capacitor Co. for example, power switches Q1-Q4 can be metal-oxide-semiconductor field-effect transistors (MOSFET). However, other types of electronically controlled switching devices (e.g., bipolar transistors [BJTs], and insulated gate transistors [IGBTs] can also be used as the power switches in certain embodiments. For example, power switches Q1-Q4 can be sequentially connected in series between a first terminal and a second terminal (e.g., the ground terminal) of an input port. One terminal of flying capacitor Cf can connect to common node SWH of power switches Q1 and Q2, and the other terminal of flying capacitor Cf can connect to common node SWL of power switches Q3 and Q4.

In particular embodiments, power switches Q1 and Q3 of the switching capacitor converter can be simultaneously turned on, power switches Q2 and Q4 can be simultaneously turned on, and the conduction times thereof may not overlap with each other. Further, the duty ratios of logic control signals VG1 and VG3 of power switches Q1 and Q3 can be equal, and the duty ratios of the logic control signals VG2 and VG4 of power switches Q2 and Q4 may also be equal. In addition, each power switch can be driven by a corresponding driver. For example, the driving circuit of the switching capacitor converter can include drivers U1, U2, U3, and U4. Drivers U1, U2, U3, and U4 may generate corresponding driving signals according to logic control signals VG1-VG4, respectively, in order to correspondingly drive and control power switches Q1-Q4.

In particular embodiments, the driving circuit for the switching capacitor converter can include a charge pump circuit that can boost DC bus voltage VBUS by voltage VCC and then supply power to driver U1 as pumping voltage Vpump. For example, pumping voltage Vpump can be the sum of bus voltage VBUS and voltage VCC, and driver U1 may provide a corresponding driving signal for power switch Q1 according to logic control signal VG1. Here, a first power terminal of power switch Q1 can connect to DC bus voltage VBUS, and a second power terminal of power switch Q1 can connect to common node SWH. Therefore, a first power supply terminal of driver U1 can connect to pumping voltage Vpump, and a second power supply terminal of driver U1 can connect to common node SWH. The two power supply terminals of driver U1 can also connect in parallel with capacitor Ca1, in order to maintain continuous power supply to driver U1.

Further, pumping voltage Vpump generated by the charge pump circuit can connect to a first terminal of capacitor Ca1 through auxiliary switch Qa1, and a second terminal of capacitor Ca1 can connect to common node SWH. In this example, the charge pump circuit can charge capacitor Ca1 during the conduction time of auxiliary switch Qa1. In particular embodiments, auxiliary switch Qa1 can be turned on and off simultaneously with power switch Q1. That is, when power switch Q1 is turned on, auxiliary switch Qa1 may also be turned on. At this time, the voltage at node SWH can be equal to DC bus voltage VBUS. Then, pumping voltage Vpump can charge capacitor Ca1 to voltage VCC. Therefore, driver U1 may have sufficient power supply voltage to provide the corresponding driving signal for power switch Q1 according to logic control signal VG1. When auxiliary switch Qa1 is turned off, power switch Q1 can also be turned off. At this time, power switches Q2 and Q4 can be turned on, and thus the voltage at common node SWH may be equal to output voltage VOUT. Accordingly, the voltage at the first terminal of capacitor Ca1 can essentially "jump" or transition to the sum of output voltage VOUT and voltage VCC, such that driver U1 may also have sufficient power supply voltage to provide a corresponding driving signal for power switch Q1 according to logic control signal VG1 when power switch Q1 needs to be turned on a next time.

In particular embodiments, voltage VCC can be the supply voltage of driver U4, and voltage VCC may be obtained by converting output voltage VOUT of the switching capacitor converter through a linear regulator. Of course, it can be understood that voltage VCC can be the same as the supply voltage of driver U4, which is one example scheme for multiplexing the voltages in the circuit, and simplifying the circuit design. In other examples, voltage VCC can also be other voltages, such as a voltage at other nodes of the circuit, or converted by using a dedicated circuit module.

In particular embodiments, blocking transistor Q5 can also be provided between DC bus voltage VBUS and power switch Q1. Blocking transistor Q5 can prevent the leakage from the output terminal to the input terminal of the switching capacitor converter. Therefore, the direction of the body diode of blocking transistor Q5 may be arranged to be coupled to the output terminal of the switching capacitor converter, and the anode of the body diode can connect to DC bus voltage VBUS. Blocking transistor Q5 can be turned on when the switching capacitor converter is in an operating state, and may be turned off when the switching capacitor converter is in a non-operating state. For example, driver U5 for driving blocking transistor Q5 can be directly powered by the charge pump circuit, in order to simplify the circuit design. For example, the first power supply terminal of driver U5 can be coupled to pumping voltage Vpump, and the second power terminal of driver U5 can connect to DC bus voltage VBUS, such that the power supply voltage of voltage VCC can be provided for driver U5.

For driver U2, a voltage between DC bus voltage VBUS and output voltage VOUT of the switching capacitor converter may be provided to supply power therefor. Driver U2 may provide a corresponding driving signal according to logic control signal VG2 for power switch Q2. Here, the first terminal of power switch Q2 can connect to node SWH, and the other terminal of power switch Q2 can connect to the output terminal of the switching capacitor converter; that is, connected to output voltage VOUT. For example, the second power supply terminal of each driver can connect to the second power terminal (e.g., drain) of the corresponding power switch, in order to be consistent with the reference of the driving logic signal. Therefore, the first power supply terminal of driver U2 can connect to DC bus voltage VBUS, and the second power supply terminal of driver U2 can also be connected to the output terminal of the switching capacitor converter. Since both power supply terminals of driver U2 receive a constant voltage, this connection arrangement may enable driver U2 to obtain a relatively constant voltage difference between DC bus voltage VBUS and output voltage VOUT as its own power supply voltage without a bootstrap capacitor, in order to drive power switch Q2. Output voltage VOUT may generally be ½ of DC bus voltage VBUS, so driver U2 can obtain sufficient power supply voltage.

For driver U3, a voltage across flying capacitor Cf may be provided to supply power for it. Driver U3 may provide a corresponding driving signal for power switch Q3 according to logic signal VG3. Here, the first power terminal of power switch Q3 can connect to the output terminal of the switching capacitor converter (e.g., to output voltage VOUT), and the second power terminal of power switch Q3 can connect to node SWL. One terminal of flying capacitor Cf can connect to the second power terminal (e.g., drain) of power switch Q3, and the voltage across flying capacitor Cf may be provided to supply voltage for driver U3. For example, the two power supply terminals of driver U3 can be directly connected in parallel with the two terminals of flying capacitor Cf. therefore, the reference ground of the power switch and the driver can also be the same. Since the voltage across flying capacitor Cf is substantially constant, which may be equal to ½ of the DC bus voltage, this connection arrangement can make driver U3 obtain a relatively stable voltage as its own power supply voltage without a bootstrap capacitor, in order to drive power switch Q3.

For driver U4, voltage VCC can be applied as its own power supply voltage, and driver U4 may provide a corresponding driving signal for power switch Q4 according to logic control signal VG4. Here, a second power terminal of power switch Q4 can connect to the reference ground. Since the second terminal of power switch Q4 is grounded, and as such is more convenient to drive as long as the low voltage power supply terminal of driver U4 is grounded and a driving voltage is provided at the high voltage power supply terminal. In one example, the power supply of driver U4 can be realized by using a linear regulator (LDO). For example, an LDO can convert the output voltage of the switching capacitor converter to obtain voltage VCC. In particular embodiments, the supply power of driver U4 can be obtained by the LDO, while in other embodiments, any suitable regulator used to realize voltage conversion and output stable voltage can be utilized in certain embodiments.

Figure 3:
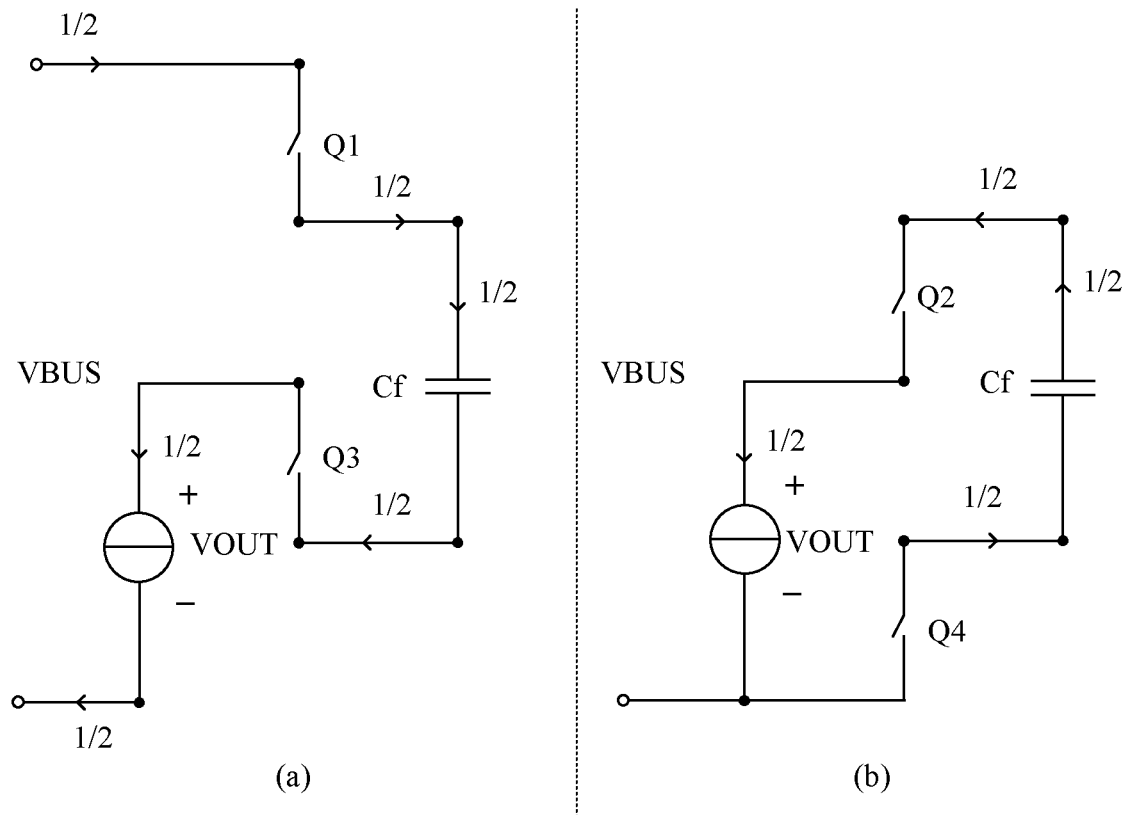
FIG. 3 is an equivalent schematic block diagram of example operation of the switching capacitor converter, in accordance with embodiments of the present invention.
Figure 4:
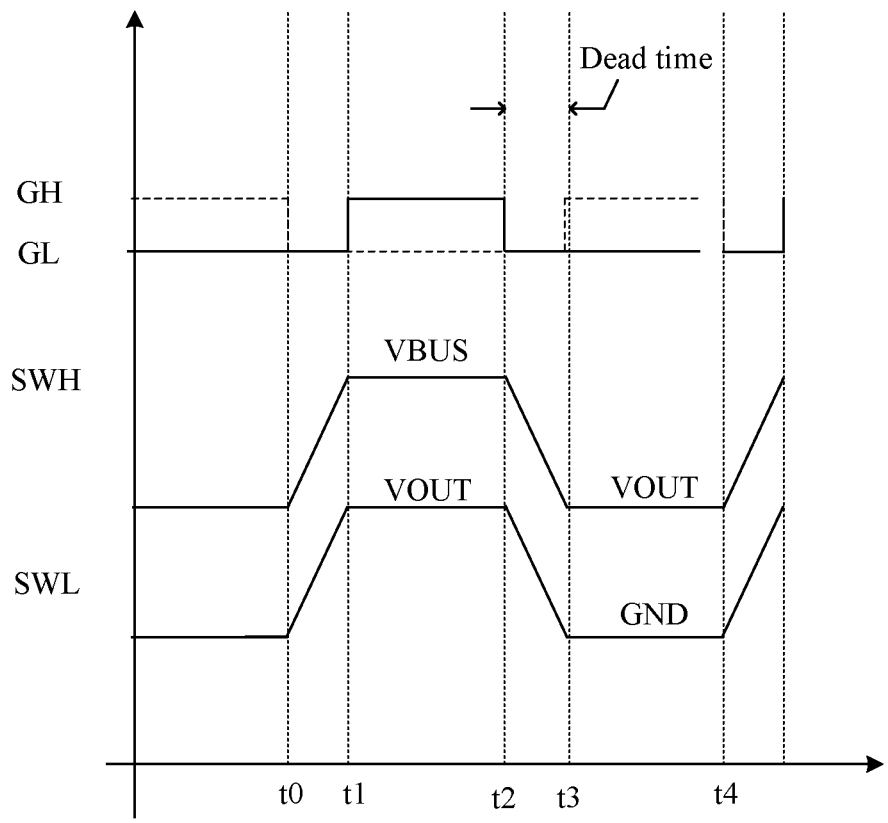
FIG. 4 is a waveform diagram of example operation of the switching capacitor converter, in accordance with embodiments of the present invention.

Referring to FIG. 3, shown is an equivalent schematic block diagram of example operation of the switching capacitor converter, in accordance with embodiments of the present invention. Referring also to FIG. 4, shown is a waveform diagram of example operation of the switching capacitor converter, in accordance with embodiments of the present invention. In (a) of FIG. 3, shown is the equivalent schematic block diagram of the operation of the switching capacitor converter when power switches Q1 and Q3 are turned on. In FIG. 4, since power switches Q1 and Q3 of the switching capacitor converter are simultaneously turned on, logic control signal VG1 and VG3 can be characterized by the same control signal GH. During time period t1 to t2, auxiliary switch Qa1 can be turned on, pumping voltage Vpump can be VBUS+VCC, and the charge pump circuit may supply power to driver U1, in order to generate an effective drive signal to control power switch Q1 to turn on. At the same time, the charge pump circuit can charge capacitor Ca1. Due to the steady state, the voltage across flying capacitor Cf can be ½ VBUS.

During this stage, power switch Q1 can be turned on, the voltage at first terminal (e.g., SWH) of flying capacitor Cf can be DC bus voltage VBUS, and the voltage at second terminal (e.g., SWL) can be output signal VOUT=½ VBUS. At this time, logic control signal VG3 of power switch Q3 may also be active, and the power supply voltage of driver U3 can be provided by flying capacitor Cf. further, the power supply voltage of driver U3 can be ½ VBUS, such that power switch Q3 can be turned on. When power switches Q1 and Q3 are turned on, DC bus voltage VBUS may supply power to the load via path Q1-CF-Q3-VOUT. At the same time, in order to avoid a direct connection, a dead time (e.g., t2 to t3) can be set between logic control signals VG1, VG3 and VG2, VG4. In (b) of FIG. 3, shown is the equivalent schematic block diagram of the operation of the switching capacitor converter when power switches Q2 and Q4 are turned on.

Referring again to FIG. 4, since power switches Q2 and Q4 of the switching capacitor converter are simultaneously turned on, logic control signal VG2 and VG4 can be characterized by the same control signal GL. During time period t3-t4, since driver U2 can be powered by the voltage between DC bus voltage VBUS and output voltage VOUT, when effective logic control VG2 (e.g., GL) arrives, an effective driving signal can be generated to control power switch Q2 to turn on. In this stage, logic control signal VG4 of power switch Q4 may also be active, and driver U4 can be powered by voltage VCC and output a driving signal to control power switch Q4 to be turned on. After that, the voltage at the second terminal of flying capacitor Cf can connect to reference ground GND, the voltage at the first terminal can be VOUT=½ VBUS, and the power supply voltage for driver U2 can be ½ VBUS. When power switches Q2 and Q4 are turned on, the voltage across flying capacitor Cf can connect in parallel with the output capacitor Co to supply power to the load.

Figure 5:
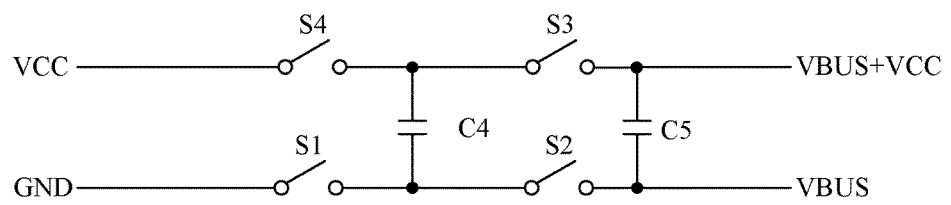
FIG. 5 is a schematic block diagram of an example charge pump circuit, in accordance with embodiments of the present invention.

Referring to FIG. 5, shown is a schematic block diagram of an example charge pump circuit, in accordance with embodiments of the present invention. For example, the charge pump circuit can raise DC bus voltage VBUS by voltage VCC, and then supply power to driver U1 as pumping voltage Vpump. Therefore, the charge pump circuit can charge the voltage across capacitor C4 to voltage VCC in the first operating stage. In the second operating stage, the negative terminal of capacitor C4 can be coupled to DC bus voltage VBUS, and the positive terminal of capacitor C4 can generate pumping voltage Vpump, which is VBUS+VCC. For example, the charge pump circuit can include capacitor C4, and the first terminal of capacitor C4 can connect to voltage VCC through switch S4, and to the output terminal of the charge pump circuit through switch S3. The second terminal of capacitor C4 can connect to reference ground GND through switch S1, and to DC bus voltage VBUS via switch S2. When the charge pump circuit is operating, switches S1 and S4 can be turned on simultaneously in the first operating stage, the other switches may be turned off, and the voltage across capacitor C4 can be charged to voltage VCC. Switches S2 and S3 can be turned on simultaneously in the second operating stage, and other switches may be turned off, such that the positive terminal of capacitor C4 may output pumping voltage Vpump.

In particular embodiments, via the driving circuit of the switching capacitor converter, the DC bus voltage can be raised by a first voltage, and then used as a pumping voltage to supply power for a first driver. Also, a voltage between the DC bus voltage and an output voltage of the switching capacitor converter can be obtained to supply power to a second driver. A voltage across a flying capacitor may be applied to supply power to a third driver. Further, the first voltage can be obtained by converting the output voltage of the switching capacitor converter using a linear regulator applied to supply power to a fourth driver. In certain embodiments, the structure of the driving circuit may be optimized, with fewer bootstrap capacitors and switches, and the driving power supply voltage of a second and third power switches may both be a half of the DC bus voltage, such that the driving loss is relatively small.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit for a switching capacitor converter, the driving circuit comprising:
   a) a first driver, a second driver, a third driver, and a fourth driver, configured to respectively drive a first power switch, a second power switch, a third power switch, and a fourth power switch according to corresponding logic control signals;
   b) a charge pump circuit configured to raise a DC bus voltage by a first voltage to obtain a pumping voltage to supply power to the first driver, wherein the first, second, third, and fourth power switches are sequentially coupled in series between the DC bus voltage and a reference ground; and
   c) wherein a high voltage supply terminal of the second driver directly receives the DC bus voltage, and a low voltage supply terminal of the second driver is coupled to an output voltage of the switching capacitor converter.

2. The driving circuit according to claim 1, wherein:
   a) a first terminal of a flying capacitor of the switching capacitor converter is connected to a common node of the first power switch and the second power switch, and a second terminal of the flying capacitor is connected to a common node of the third power switch and the fourth power switch; and
   b) the first power switch and the third power switch are simultaneously turned on, the second power switch and the fourth power switch are simultaneously turned on, and a conduction time of the first power switch and a conduction time of the second power switch do not overlap with each other.

3. The driving circuit according to claim 2, wherein the third driver is powered by a voltage across the flying capacitor.

4. The driving circuit according to claim 1, wherein the fourth driver is powered by the first voltage, and one terminal of the fourth driver is connected to the reference ground.

5. The driving circuit according to claim 1, wherein the first voltage is obtained by converting an output voltage of the switching capacitor converter through a linear regulator.

6. The driving circuit according to claim 1, further comprising a first capacitor connected in parallel with two power supply terminals of the first driver for supplying power to the first driver.

7. The driving circuit according to claim 6, wherein an output terminal of the charge pump circuit is coupled to the first capacitor through a first auxiliary switch, and the pumping voltage charges the first capacitor during a conduction period of the first auxiliary switch, in order to supply power to the first driver.

8. The driving circuit according to claim 7, wherein the first auxiliary switch is turned on and off simultaneously with the first power switch.

9. The driving circuit according to claim 1, further comprising a blocking transistor coupled between the DC bus voltage and the first power switch, wherein the blocking transistor is configured to prevent electric leakage from an output terminal to an input terminal of the switching capacitor converter, and wherein the blocking transistor is driven by a fifth driver that is powered through the charge pump circuit.

10. The driving circuit according to claim 1, wherein:
a) the charge pump circuit comprises a fourth capacitor that is charged to the first voltage in a first operating stage; and
b) in the second operating stage, one terminal of the fourth capacitor is coupled to the DC bus voltage, and a voltage at the other terminal of the fourth capacitor is the pumping voltage.

11. The driving circuit according to claim 10, wherein:
a) the charge pump circuit further comprises a first switch, a second switch, a third switch, and a fourth switch;
b) a first terminal of the fourth capacitor is coupled to the first voltage through the fourth switch, and to an output terminal of the charge pump circuit through the third switch;
c) a second terminal of the fourth capacitor is coupled to the reference ground through the first switch, and to the DC bus voltage through the second switch;
d) the fourth switch and the first switch are simultaneously on and off in the first operating stage; and
e) the second switch and the third switch are simultaneously on and off in the second operating stage.

* * * * *